Patented Dec. 6, 1927.

1,651,474

UNITED STATES PATENT OFFICE.

GEORGE McINTOSH SCOTT, OF LONDON, ENGLAND.

VITREOUS ENAMEL COMPOSITION AND METHOD OF MAKING SAME.

No Drawing. Application filed September 24, 1925, Serial No. 58,363, and in Great Britain October 22, 1924. Renewed July 16, 1926.

This invention relates to vitreous enamel compositions and methods of making same. The composition is especially useful in producing designs upon vitreous surfaces by the use of a mesh stencil in applying the design. In reissue United States Letters Patent Number 16,048, reissued April 21, 1925, and granted to Herbert Hamilton Scott and George McIntosh Scott, there is described a method of producing such designs utilizing a pasty vitreous enamel composition containing finely ground vitreous enamel and an oily carrier, the composition being applied to the enamel surface by pressing the composition through a fine mesh stencil.

It was pointed out in said specification that it is important to have the composition in the form of a pasty consistency so that it would be deposited on the enamel surface, after passing through the mesh, in finely divided form, and that it must contain an oily vehicle to lubricate it to enable it to pass through the fine mesh, and that the ingredients mixed with the ground frit or enamel should be of such a character that the composition will not dry out too rapidly, and that they may be readily volatilized without damage to the enamel when the latter is fired.

The composition thus used as disclosed in said patent comprises enamel frit, a suitable coloring oxide, beeswax, turpentine, paraffin oil (kerosene), and a varnish such as lithovarnish which is composed largely or treated linseed oil.

The object of the present invention is to provide an improved vitreous enamel composition which is particularly useful in, although in the broadest aspect of the invention, not limited to, the production of designs according to the process of said patent.

The invention consists in the composition which is hereinafter described according to the preferred embodiment of the same, and in the novel features thereof, and in the process and novel features of the process of compounding or making the same.

I have found that such vitreous enamel compositions are improved by the use therein of an oily medium that will liberate that part of the kerosene which is in suspension in the composition. I have found that a suitable mineral grease or jelly such as petroleum jelly—commonly known as vaseline—is well suited for this purpose; and one aspect of the present invention comprises the use of such an oily medium in a vitreous enamel compound. I have further found that the ingredients of the composition embodying the present invention combine more readily; that the composition does not dry out so quickly as the old composition, and that the combustible ingredients burn out of the enamel more readily.

Further objects and advantages of the invention will more fully appear from the following description of a preferred embodiment of the composition and method of producing the same.

The quartz or quartz-like material—"enamel frit"—preferably admixed (as by grinding) with any desired mineral coloring oxide, is mixed with a suitable vegetable oil such as oxidized linseed oil, and a suitable mineral oil such as paraffin oil in sufficient quantity to form a damp powder, and the latter is then worked up with a suitable mineral grease or jelly, such as petroleum jelly, to the desired pasty consistency suited to transmission through the meshes of the stencil. A quantity of tallow as hereinafter described may also be used with the vegetable and mineral oils. As will be understood, the combustible or carbonaceous matter burns away during the subsequent firing of the article after the design has been applied by means of the stencil, and it is therefore desirable to employ as little of the carbonaceous matter as possible in arriving at the desired pasty consistency of the composition, and to use ingredients which will effect the proper lubrication of the enamel composition through the meshes of the stencil consistent with maintaining a pasty consistency, and which can be volatilized without endangering the enamel.

Inasmuch as the petroleum jelly causes some of the paraffin oil to separate out from the pasty mass after standing, I find it advantageous in the case of such separation to remove the freed paraffin oil, and restore the mass to the desired pasty consistency by means of more petroleum jelly.

In order that the invention may be clearly understood and readily carried into effect, I will now describe in further detail a composition giving satisfactory results and a method of compounding the same.

I take about thirty parts by weight of paraffin oil and three parts by weight of tallow to one part by weight of oxidized linseed oil and mix them by stirring at a temperature sufficient to melt the tallow and I then add the ground frit or quartz-like material and mineral coloring matter until a damp powdery mass is obtained and then work up the same to the desired greasy pasty consistency by means of petroleum jelly.

In place of ordinary linseed oil I may use a somewhat thickened grade or modified form or substitute such for example as lithovarnish, in which case the tallow may be omitted and the amount of lithovarnish increased. In either case I find it advantageous to use the petroleum jelly in two stages, the pasty mass first formed being allowed to stand for a few days to allow the jelly to cause some of the paraffin oil to separate out, whereupon this excess is drained off from the top of the mass and the latter is again worked up to the desired pasty consistency by means of more petroleum jelly.

It will be understood, of course, that instead of using the oils or jelly or grease above described, suitable compositions containing same may be substituted so long as these compositions did not contain matter which interferes with the lubrication of the composition through the mesh of the stencil, or with the proper volatilization of the products from the enamel when the latter is fired, in a manner not to damage the enamel; and I wish to be understood in the appended claims by reference to such ingredients to include not only such ingredients but any suitable compositions containing the same.

While I have described my invention in detail with respect to one particular example of the composition embodying the invention which gives satisfactory results, and to the preferred method of compounding same, it will be understood by those skilled in the art, after understanding my invention, that various changes and modifications may be made without departing from the spirit or scope of the invention, and I aim in the appended claims to cover all such changes and modifications.

What I claim as new and desire to secure by Letters Patent, is:

1. Process for the production of vitreous enamel compositions which comprises mixing together one or more oils, enamel frit, a coloring oxide, and a mineral grease or jelly such as petroleum jelly, to substantially a pasty consistency.

2. Process for the production of a vitreous enamel composition which comprises mixing a vegetable oil such as oxidized linseed oil, a mineral oil such as paraffin oil, and ground enamel frit and mineral coloring matter to substantially a pasty consistency, by the use of a mineral grease or jelly such as petroleum jelly.

3. Process for the production of vitreous enamel compositions which comprises mixing one or more oils, enamel frit and a coloring oxide and working up the same with a mineral grease or jelly such as petroleum jelly.

4. A process for the production of vitreous enamel compositions for use in making vitreous enamel designs comprising working up a vegetable oil such as oxidized linseed oil, a mineral oil such as paraffin oil, and frit or quartz-like material and any desired mineral coloring matter, to a pasty consistency suited to transmission through a fine mesh stencil, by means of a mineral grease or jelly such as petroleum jelly.

5. Process for the production of vitreous enamel compositions which comprises mixing oxidized linseed oil and paraffin oil with enamel frit and a mineral coloring matter and then working up this mixture to a greasy substantially pasty consistency by means of petroleum jelly.

6. A process for the production of vitreous enamel compositions for use in making vitreous enamel designs, comprising mixing oxidized linseed oil and paraffin oil in such proportion with enamel frit and mineral coloring matter as to produce a damp powder and working up the same to a greasy pasty consistency suited to transmission through a fine mesh stencil by adding petroleum jelly.

7. Process for the production of vitreous enamel compositions which comprises making a liquid composition by mixing paraffin oil and linseed oil, mixing therewith ground enamel frit and mineral coloring matter to obtain a pasty consistency, and then working up the mass with a mineral grease or jelly.

8. Process for the production of vitreous enamel compositions which comprises making a liquid composition by mixing and heating paraffin oil, linseed oil and tallow, mixing therewith ground enamel frit and mineral coloring matter and then working up the mass to substantially a greasy pasty consistency by means of petroleum jelly.

9. Process for the production of vitreous enamel compositions which comprises mixing a vegetable oil such as linseed oil, paraffin oil, ground enamel frit and a mineral coloring matter with an oily medium which will liberate from the mixture that part of the paraffin oil which is held in suspension.

10. A vitreous enamel composition comprising finely ground enamel frit, a coloring oxide, vegetable and mineral oils and a mineral grease or jelly.

11. A vitreous enamel composition of a pasty consistency comprising finely ground enamel frit, a coloring oxide, a vegetable oil such as linseed oil, a mineral oil such as paraffin oil and petroleum jelly.

In testimony whereof I have signed my name to this specification.

GEORGE McINTOSH SCOTT.